(12) United States Patent
Wolf et al.

(10) Patent No.: US 8,490,778 B2
(45) Date of Patent: Jul. 23, 2013

(54) CONTAINER FEEDING MEANS, AND TREATMENT MACHINE HAVING A FEEDING MEANS OF THIS TYPE

(75) Inventors: Uwe Wolf, Bad Kreuznach (DE); Stefan Freund, Bingen (DE)

(73) Assignee: KHS GmbH, Dortmund (DE)

( * ) Notice: Subject to any disclaimer, the term of this patent is extended or adjusted under 35 U.S.C. 154(b) by 104 days.

(21) Appl. No.: 13/126,185

(22) PCT Filed: Oct. 28, 2009

(86) PCT No.: PCT/EP2009/007687
§ 371 (c)(1),
(2), (4) Date: Apr. 27, 2011

(87) PCT Pub. No.: WO2010/063347
PCT Pub. Date: Jun. 10, 2010

(65) Prior Publication Data
US 2011/0220464 A1 Sep. 15, 2011

(30) Foreign Application Priority Data
Dec. 1, 2008 (DE) .................... 10 2008 059 746

(51) Int. Cl.
*B65G 33/34* (2006.01)
(52) U.S. Cl.
USPC .................................... 198/459.2; 198/459.4
(58) Field of Classification Search
USPC ................. 198/459.2, 459.3, 459.4, 467.1
See application file for complete search history.

(56) References Cited

U.S. PATENT DOCUMENTS

| 1,355,184 A | | 10/1920 | Taliaferro et al. |
| 2,571,036 A | | 10/1951 | Heyne et al. |
| 2,596,987 A | * | 5/1952 | Day et al. ..................... 366/217 |
| 2,630,904 A | | 3/1953 | Bozek et al. |
| 2,692,671 A | * | 10/1954 | Fauth et al. ................. 198/459.4 |
| 2,768,656 A | | 10/1956 | Day et al. |
| 2,859,858 A | * | 11/1958 | Stover ......................... 198/459.2 |
| 3,565,235 A | | 2/1971 | Brown |
| 3,656,235 A | * | 4/1972 | Zuurveen ................... 30/346.51 |
| 3,771,576 A | * | 11/1973 | Gellatly et al. .............. 141/150 |
| 4,265,357 A | * | 5/1981 | Amberg et al. ............ 198/459.4 |

(Continued)

FOREIGN PATENT DOCUMENTS

| JP | 57121521 | 7/1982 |
| JP | 2000159329 | 6/2000 |
| NL | 7300457 | 7/1973 |

*Primary Examiner* — Mark A Deuble
(74) *Attorney, Agent, or Firm* — Occhiuti Rohlicek & Tsao LLP

(57) ABSTRACT

An inlet worm (11) for use in a treatment machine (1) for treating bottles or containers (2) of the like, having at least one distributing or inlet worm (11) which is provided to the side of a transport path (3), is driven by a drive device so as to rotate about a worm axis, and forms a conveying path or helix for the containers (2) on at least one worm body which is provided on a worm receptacle, having at least one transport star (12) which is assigned to the inlet worm, can be driven so as to rotate about a transport-star axis and has a multiplicity of container receptacles which are provided distributed about the transport-star axis at uniform angular intervals which correspond to a machine gauge, and having a drive device for the synchronous and angularly accurate drive of the at least one inlet worm (11) and the at least one transport star (12).

17 Claims, 4 Drawing Sheets

U.S. PATENT DOCUMENTS

| | | | |
|---|---|---|---|
| 5,477,956 A * | 12/1995 | Liebhart | 198/459.4 |
| 7,284,577 B2 * | 10/2007 | Yoneda | 141/129 |
| 7,581,635 B2 * | 9/2009 | Lecomte | 198/459.4 |
| 2004/0007438 A1 * | 1/2004 | Baranowski | 198/459.2 |

* cited by examiner

CONTAINER FEEDING MEANS, AND TREATMENT MACHINE HAVING A FEEDING MEANS OF THIS TYPE

CROSS-REFERENCE TO RELATED APPLICATIONS

This application is the National Stage of International Application No. PCT/EP2009/007687, filed on Oct. 28, 2009, which claims the priority of German Patent Application No. 10 2008 059 746.5, filed on Dec. 1, 2008. The contents of both applications are hereby incorporated by reference in their entirety.

FIELD OF DISCLOSURE

This disclosure relates to container processing, and in particular, to feeding containers into a treatment machine.

In facilities for treating containers, especially facilities used in the beverage industry, there is a need in many areas for containers, which feed into a treatment machine via an external transporter standing upright, but unordered and e.g. abutting, i.e. touching each other, to be fed via a container inlet or a container feeding means in orderly fashion and in particular also equally spaced, i.e. to feed them in such a way that the containers are at intervals from each other which correspond to the respective machine spacing or the respective machine gauge and so can be fed to the treatment positions provided within the treatment machine with the necessary positioning accuracy. Treatment machines are usually those which have treatment positions on a transporter, for example on a rotating rotor. Machines of this type are, for example, filling machines, labelling machines, machines for imprinting containers on their exterior areas and/or on neutral, i.e. not printed, areas of labels already provided there, rinsers, inspection machines, sealers, etc.

Container feeding means for the orderly feeding and spacing or separation of containers to the interval corresponding to the respective machine gauge are common and known in the art, which consist of a distributing or inlet worm arranged to the side of a transport path for the containers and driveable in rotation, and of a transport star attached to the inlet worm in the direction of transport of the containers and driveable in rotation about a vertical axis.

Normally inlet worms consist essentially of a worm body with a conveying path or helix, which is arranged on, for example, a shaft- or rod-type worm receptacle where it is fixed by pinning. The containers are guided in the respective inlet worm by the flank of the helix of the inlet worm. As the pitch of this helix increases in the direction of transport, there ensues an acceleration and separation of the containers to the required interval corresponding to the machine gauge. In order to prevent excessive constraints and effects of forces of the inlet worm on the containers and vice versa, it is also usual to design inlet worms and/or their worm body with an external diameter which expands or increases in the direction of transport.

The inlet worm is positioned with respect to the attached transport star in such a way that each container which has been moved with the inlet worm to a container transfer position between this worm and the transport star, while still in the inlet worm or in the helix thereof at this container transfer position, is also simultaneously already at least partially received in a container receptacle of the transport star and thus can then be smoothly conveyed further with the transport star. This requires not only that the inlet worm and the transport star are driven synchronously with each other and with the transporter (e.g. rotor) of the treatment machine and also at the appropriate speed, but also in synchrony with or matched to the angle of rotation. This means that the rotation of the inlet worm is exactly matched to the rotation of the transport star in such a way that whenever the helix of the inlet worm reaches the container transfer position, there is also a container receptacle of the transport star there, i.e. at least in this condition of the container feeding means there is the most exact possible matching of the angular position of the worm in relation to the angular position of the transport star.

It is therefore essential for the smooth functioning of the respective container feeding means and the treatment machine having these feeding means as a whole that the inlet worm is correctly positioned in relation to the transport star and also the respective current rotational or angular position of the inlet worm corresponds to a predetermined rotational or angular position of the transport star, i.e. there is as exact as possible matching of the angular position of the worm in relation to the angular position of the transport star.

According to former practice, the fitting of the inlet worm in alignment with the following transport star takes place such that its worm body is pushed onto the worm receptacle and then aligned with the transport star and/or with a container receptacle there, in the correct position and also in relation to the rotational or angular position. In so doing, a container is inserted into a receptacle of the transport star moved to the transfer position, and is in fact positioned between this transport star and the inlet worm and/or the worm body in such a way that the container is located partly in the container receptacle of the transport star and partly in the helix of the inlet worm. The inlet worm and/or the angular position of the worm is thereby aligned by twisting the worm body with respect to the worm receptacle, but also in some cases by axial displacement of the worm body relative to the worm receptacle, insofar as a positional alignment or adjustment of the inlet worm is necessary. Once the inlet worm has been set as necessary, this setting is secured by pinning the worm body onto the worm receptacle, and this is done by pre-drilling the worm body and the worm receptacle and by inserting at least one pin.

During the operation of treatment machines, the problem frequently arises that, due to wear or because of dimensional deviations in the containers to be treated, a resetting or readjustment, in particular a new angular positioning of the inlet worm, is necessary. In the case of known inlet worms or container feeding means this is only possible by removing the existing pinning, followed by the necessary resetting or readjustment of the inlet worm and/or of the worm body, followed by renewed pinning, and this involves renewed pre-drilling of the worm body and the worm receptacle and renewed insertion of at least one pin. This is time-consuming and expensive, the latter being due, also, to the substantial associated machine stoppage times. Furthermore, it is impossible to carry out such resettings or readjustments as and when required, since with every resetting, new pin holes have to be inserted into the inlet worm and the worm receptacle, which leads to a substantial weakening of these components.

SUMMARY

The problem of the invention is to demonstrate a container feeding means which avoids these disadvantages.

In the container feeding means according to the invention, coupling and/or adjustment means are provided in the drive train between the inlet worm and/or the at least one worm body and the drive device driving the worm, to enable the setting or adjustment of the angle of rotation of the inlet worm or of the at least one worm body of this worm in relation to the transport star co-operating with the distributing worm and/or a setting or adjustment of the position of the inlet worm in relation to this transport star, without the existing pinning having to be undone and without the need for new pinning after the setting and/or adjustment.

The coupling and/or adjustment means, in particular for the setting and/or adjustment of the rotational position and/or the angle of rotation of the inlet worm can be in a wide variety of designs, for example in the form that, for setting and/or adjustment, a quick and easy disconnection of the drive link between the inlet worm and the drive device and, following the setting and/or adjustment, an equally quick and easy restoration of the drive link is possible, for example by a clamp connection, by a coupling device with a snap connection or toothing, in particular fine toothing. The angular adjustment can also be made by an adjustment device integrated into the worm receptacle and/or by providing a gear arrangement enabling rotational displacement, for example a differential gear, in the drive train.

Refinements, advantages and potential applications of the invention are also disclosed by the following description of embodiments and from the figures. All the features described and/or graphically illustrated are in principle the subject matter of the invention, either individually or in any combination, regardless of their summary in the claims or their back-reference. The content of the claims is also made an integral part of the description.

The present invention also extends to such distributing or conveying worms as are used to transfer containers which are already at machine gauge from one part of the facility to another part of the facility. Transfer worms of this type are used in the beverage industry, for example, when different types of containers or products are to be sealed in different ways.

The present invention also extends to such distributing or conveying worms which serve essentially to stabilise the containers, and this is done by the fact that these worms guide the containers as a railing substitute and secure them against falling over.

For the sake of simplification and to improve the legibility of the present application, henceforth only inlet worms will be mentioned whereby all statements made obviously apply analogously for the aforementioned transfer or guiding worms.

BRIEF DESCRIPTION OF THE FIGURES

The invention will next be explained in more detail with the aid of the figures on the basis of one embodiment. The figures show.

DETAILED DESCRIPTION

Figure 1:
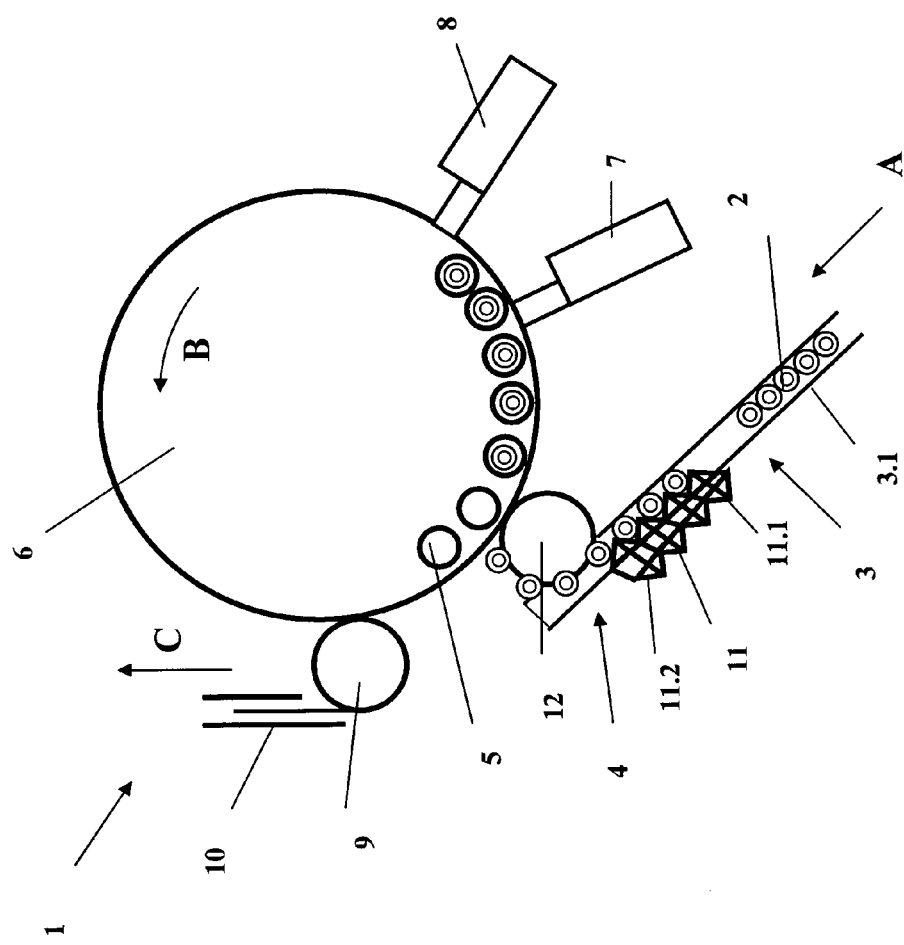
FIG. 1 in diagrammatic view and in top view, a rotary-type treatment machine for treating containers in the form of bottles.
Figure 2:
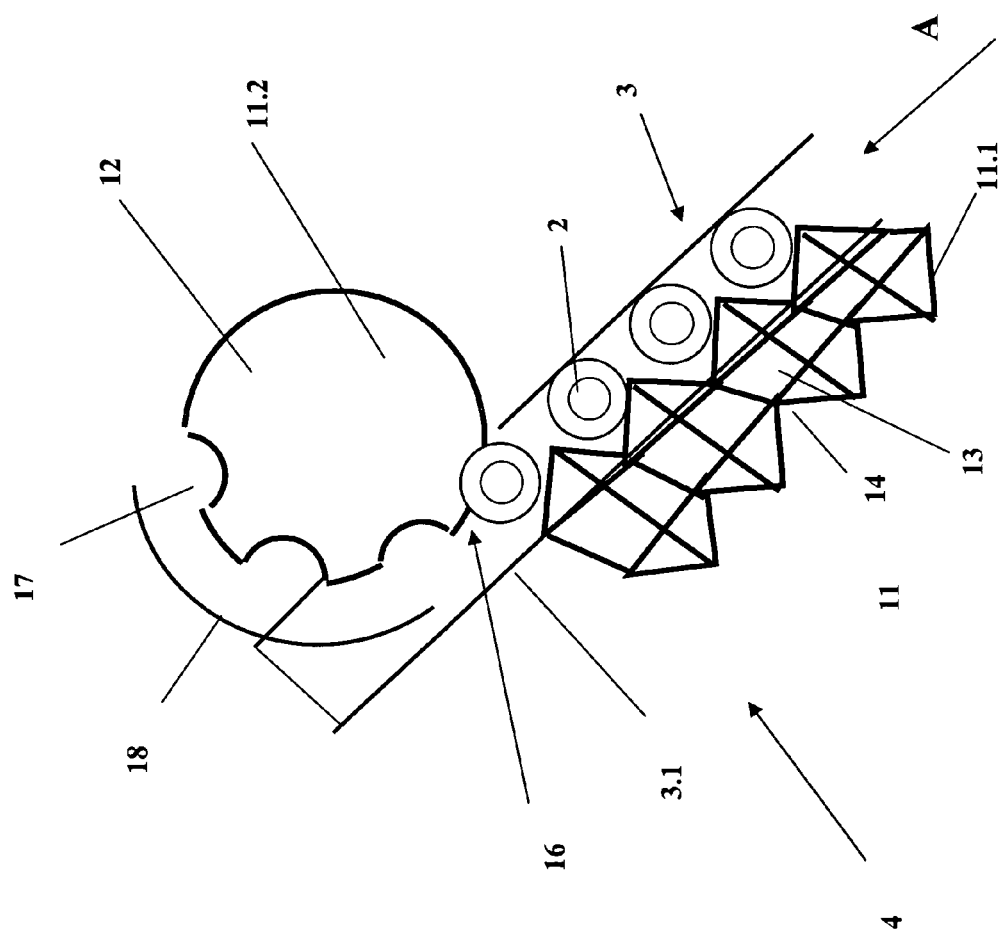
FIG. 2 in diagrammatic detailed view, the container feeding means from the treatment machine in FIG. 1, composed of a distributing or inlet worm and an attached inlet star.

In the figures, 1 is a treatment machine for treating containers in the form of bottles 2. The treatment machine 1 in the embodiment shown in FIG. 1 is a labelling machine.

The bottles 2 for treatment and/or labelling are fed into the treatment machine 1 in a single-line stream of containers or bottles, in which the bottles 2 are arranged abutting, i.e. closely adjacent one another, standing upright, via an external transporter 3 in a direction of transport A and each reach a treatment position 5 via a container feeding means 4 of the treatment machine 1, which treatment position is provided with a multiplicity of identical treatment positions 5 at the perimeter of a rotor 6 driveable in rotation about a vertical machine axis in the direction of the arrow B. The treatment positions 5 are provided at equal angular intervals, which correspond to the machine gauge, at the perimeter of the rotor 6.

Each bottle 2 delivered to a treatment position 5 is moved, with the rotating rotor 6, past two labelling units 7 and 8, which are provided to affix two labels on each bottle 2, for example to affix a body label and a face label on each bottle 2 at the periphery of the rotor 6, stationary in relation thereto. The treated, i.e. labelled, bottles 2 are taken from the respective treatment position 5 at a container outlet formed by a transport or outlet star 9 and passed on to an external transporter 10, via which the treated, i.e. labelled, bottles 2 are fed for further application, for example to a packer, in the direction of arrow C.

The container feeding means 4 consist, in the embodiment shown, essentially of an inlet worm 11 and an inlet star 12 attached to this inlet worm 11 in the transport direction A. The inlet worm 11 is arranged in the known way in the part of the external transporter 3 forming the container feeding means 4 to the side of the transport path formed by this transporter, in the form that the longitudinal axis AS of the inlet worm 11 and/or of the worm body 13 of the inlet worm 11, which is e.g. made from an abrasion-resistant plastic, are arranged horizontally or essentially horizontally and also parallel or essentially parallel to the direction of transport A of the external transporter 3. At the perimeter of its worm body 13, the inlet worm 11 is designed with a conveying path or helix 14, which extends from the worm end 11.1 at the front in relation to the direction of transport A, at a distance from the inlet star 12, to the worm end 11.2, backwards in direction of transport A, immediately adjacent the inlet star 12 and has an increasing pitch in direction of transport A. Also, the external diameter of the worm body 13 increases in direction of transport A, i.e. from worm end 11.1 to worm end 11.2.

The number 15 designates a shaft-type worm receptacle on which the worm body 13 is arranged and which extends through the worm body 13 over the entire length of the distributing worm 1. The worm receptacle 15 is pivoted about the axis AS of the distributing worm 11. The worm body 13 also, as described in more detail below, has a driving connection with the worm receptacle 15.

Each bottle 2 conveyed to the container feeding means is taken up by a partial area of its perimeter in the helix 14 and, with the inlet worm 11 driven in rotation about the axis AS, accelerated as a result of the increasing pitch of the helix 14, so that the bottles 2 are ultimately transferred at the worm end 11.2 and/or at a transfer position 16 there, with the machine gauge, to the inlet star 12. The external transporter 3 is provided with lateral guide rails 3.1, so that the bottles 2 taken up into the helix 14 of the inlet worm 11 can be supported laterally, i.e. on their perimeter area projecting out of the helix, on a guide rail 3.1.

The inlet star 12 is provided on its perimeter with a multiplicity of pocket-like recesses or container receptacles 17 open towards the perimeter, which each serve to receive a bottle 2 and which are provided distributed about the vertical axis of the inlet star 12 at equal angular intervals, which in turn correspond to the machine gauge. In order to secure the bottles 2 in the container receptacles 17 of the inlet star 12, a guide curve is provided in known fashion, which is indicated in the figures schematically as 18 and which forms a bearing surface for the part of the bottles 2 projecting out of the container receptacles 17.

In order to enable the bottles 2 which are initially fed in abutting via the external transporter 3 and then brought to the machine gauge to be transferred in each case to a treatment position 5, it is necessary i.a. for the inlet worm 11 and the inlet star 12 to be driven synchronously with each other and also synchronously with the rotor 6, so the rotation of the inlet worm 11 i.a. temporally and also in terms of speed is precisely matched to the rotation of the inlet star 12. It is also necessary for the rotational or angular position of the rotational movement of the inlet worm 11 to be very precisely matched to the rotational or angular position of the inlet star 12 and the inlet worm 11 is further generally positioned in such a way that each bottle 2 conveyed to the transfer position 16 is initially arranged there with a partial area of the external surface of its bottle both in the helix 14 and in a container receptacle 17 of the inlet star 12, before this bottle 2 is then moved on with the rotating inlet star 12. This precise setting and/or adjustment of the inlet worm 11 in relation to the inlet star 12 is generally conducted e.g. using a bottle 2 in such a way that a container receptacle 17 is moved to the transfer position 16 and the bottle is placed in this container receptacle 17. After this, if necessary, the inlet worm 11 is adjusted in the axis AS, in particular however the angular adjustment, by twisting the worm body 13 with respect to the worm receptacle 15 about the axis AS in the form that the bottle 2 used in the adjustment is also taken up in a fitting manner at the worm end 11.2 into the helix 14. This breaks the connection between the worm body 13 and the worm receptacle 15. In the setting thus obtained, the worm body 13 is then fixed to the worm receptacle 15, i.e. the connection between the worm body 13 and the worm receptacle 15 is restored.

Figure 3:
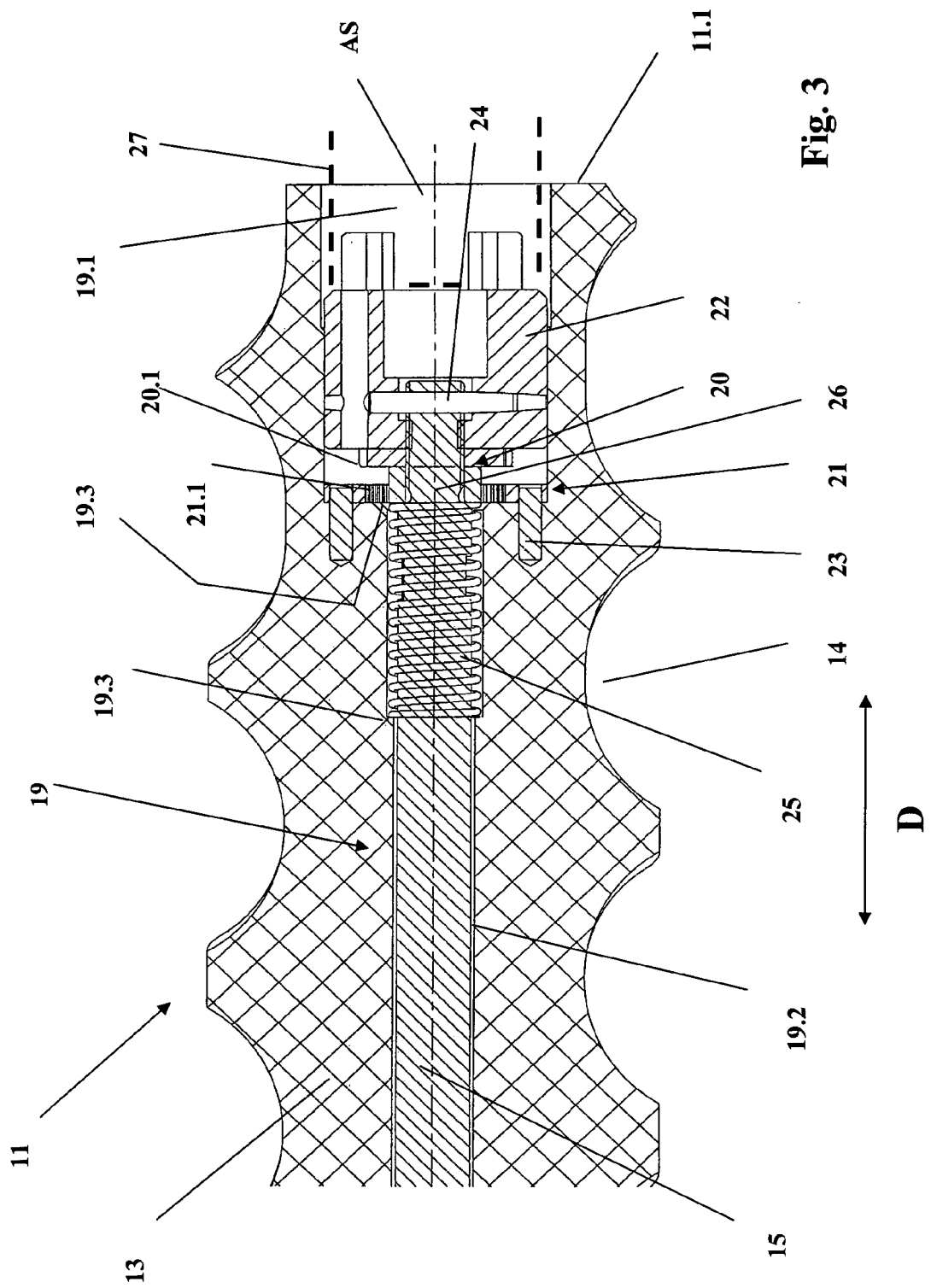
FIG. 3 in partial view and in longitudinal section, the inlet worm from the container feeding means from the treatment machine in FIG. 1.

The rod or shaft-type worm receptacle 15, which is taken up into an opening 19 of the worm body 13 extending between the worm ends 11.1 and 11.2, is axially displaceable relative to the worm body 13 (double arrow D), between an unlocked condition shown in FIG. 3, in which the connection between the worm receptacle 15 and the worm body 13 is broken, and a locked condition, in which there is a connection between the worm receptacle 15 and the worm body 13, and to this end a coupling element 20, provided on the worm receptacle 15, engages in a coupling element 21 on the worm body 13.

The pin or shaft-type worm receptacle 15, at its end adjacent the worm end 11.1, is provided with a head piece 22 with an enlarged cross-section, which abuts with its circular-cylindrical perimeter area concentrically surrounding the axis AS on the equally circular-cylindrical perimeter area of an opening section 19.1 which has an enlarged cross-section of the opening 19. The coupling element 20 is fixed to the face turned away from the worm end 11.1, said coupling element being designed as a toothed wheel with a ring-shaped external toothing 20.1 concentrically surrounding the axis AS.

The coupling piece 21 is formed by a ring, which is arranged in the opening section 19.1, on an area 19.3 thereof which is formed by the transition between the opening section 19.1 and an opening section 19.2 with a reduced cross-section. The coupling piece 21 is anchored in the worm body 13 by pins 23. The ring forming the coupling piece 21 is provided with a ring-shaped inner toothing 21.1 concentrically surrounding the axis AS, and this toothing is designed to fit the external toothing 20.1, so that in the locked condition, i.e. with the coupling piece 20 taken up into the ring-shaped coupling piece 21 via the toothings 20.1 and 21.1, the connection, which is also a driving connection, between the worm receptacle 15 and the worm body 13 is produced, while in the unlocked or not locked condition the coupling piece 20, with its toothing 20.1, is axially offset outside the ring-shaped coupling piece 21.

The relatively large diameter of the coupling piece 20 and of the ring opening of the coupling piece 21 give rise not only to an optimal design with respect to the torques to be transferred, but the toothings 20.1 and 21.1 can also, in particular, be designed as fine toothings with a multiplicity of teeth, so that as a result a gradual angular adjustment of the inlet worm 11 and/or of the worm body 13 in small angular steps, for example in toothings 20.1 and 21.1 with one hundred teeth each in angular steps of 3.6°, is possible. It goes without saying that, depending on the accuracy desired, different numbers of teeth can also be selected.

Obviously, other coupling devices known to the person skilled in the art can be used, for example coupling elements with spur-cut elements, all forms of clamp elements, clamping sleeves, and, with a corresponding design of the worm body 13 and the worm receptacle 15, also elements for connecting shaft and hub.

In the embodiment shown in FIG. 3, the head piece 22 is fixed by a split-pin 24 onto the shaft forming the worm receptacle 15. Other embodiments are also possible.

A pressure spring, designated as 25, surrounds the shaft forming the worm receptacle 15 and rests with one end against a step or shoulder 19.4 of the opening section 19.2 and with the other end via an intermediate ring 26 on the head piece 22 or on the coupling piece 20 thereon. The pressure spring 25 pre-tensions the worm receptacle 15 and hence also the coupling element 20 in the unlocked condition, in which the angular adjustment can be performed by rotating the worm body 13 relative to the worm receptacle 15. Following the angular adjustment and during normal operation of the treatment machine 1, the locked condition between the worm receptacle 15 and the worm body is maintained against the effect of the pressure spring 25, and this is effected by an external drive element, indicated in FIG. 3 by the broken line 27, to drive the inlet worm 11 via the head piece 22. The drive element 27 is axially adjustable in such a way that with the worm body 13 resting on the worm end 11.2 and with the worm receptacle 15 displaced by the drive element 27 against the effect of the pressure spring 25, the driving connection is maintained via the coupling pieces 20 and 21 following the angular adjustment and during normal operation of the treatment machine 1.

In the embodiment shown in FIG. 3, the detachable connection between the worm body 13 and the worm receptacle 15 is realised by a coupling device with the two toothed-wheel-type coupling elements 20 and 21. Other embodiments are also possible, for example embodiments similar to the embodiment from FIG. 3, in which only one of the two coupling elements 20 or 21 is provided with a multiplicity of teeth or with a toothing 20.1 or 21.1, while the other coupling element 21 or 20 respectively, instead of a continuous toothing, has only individual tooth-like projections.

Figure 4:
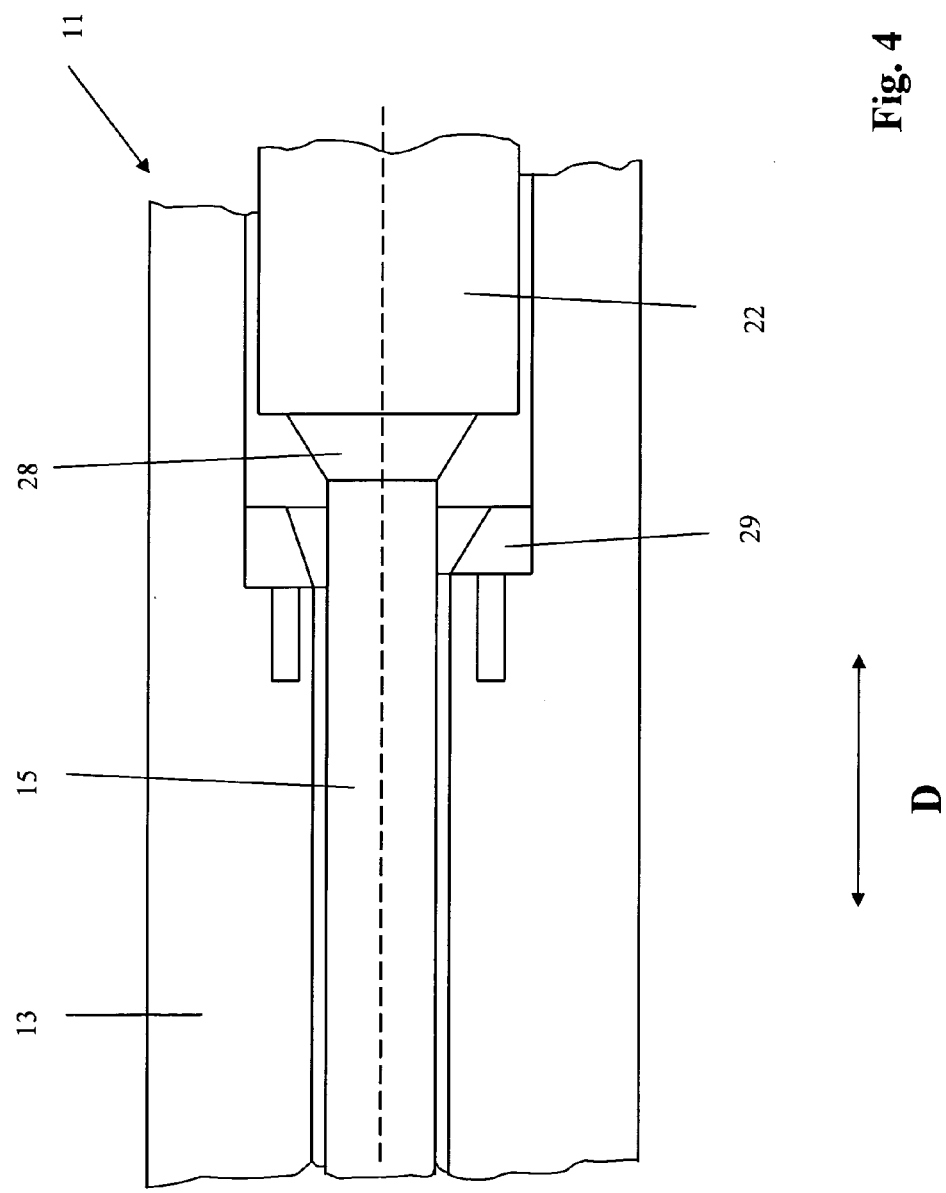
FIG. 4 in highly simplified view, a longitudinal section of the inlet worm from the container feeding means in a further embodiment.

Coupling devices are also possible in which the detachable connection between the worm receptacle 15 and the worm body 13 is produced by clamps, for example by Morse cone-type clamps. In an embodiment of this type, as illustrated in FIG. 4, the worm receptacle 15 is then, for example, axially displaceable (double arrow D) in turn for locking and unlocking its connection with the worm body 13, so that in the locked condition a clamping cone 28, e.g. provided with ribbing or toothing, engages on the worm receptacle 15 for a non-positive and/or positive connection in a matching recess on the worm body 13 formed from a clamping ring 29 and in the unlocked condition, which is shown in FIG. 4, these elements are spaced apart from each other axially, at least so far that the non-positive and/or positive connection is broken.

If axial displacement of the inlet worm 11 is necessary, this preferably occurs, in the embodiment shown in FIG. 3, by axially displacing the worm receptacle 15 and/or the axial support for the worm end 11.2.

The invention has been described above on the basis of one embodiment. It goes without saying that numerous alterations and modifications are possible, without thereby departing from the inventive concept on which the invention is based.

Instead of the previously described way of adjusting the angle of the inlet worm, which involves, prior to the angular adjustment, breaking the connection between the inlet worm 11 or the worm body 13 and the drive of the inlet worm 11 and restoring this connection after the angular adjustment, it is also possible to provide the worm receptacle with an adjusting device for the angular adjustment. The worm receptacle is then designed in at least two parts, one part being driveably connected with the worm drive, and one part being connected to the worm body. The adjustment device used to adjust the angle of the inlet worm is then provided between the two parts.

It is also possible to provide gearing in the drive train of the respective inlet worm, for example a differential gear, with which the angular adjustment can be made.

All embodiments of the invention have in common the fact that the respective inlet worm and/or its drive are already equipped with means which enable at least the angular adjustment, and it is therefore not necessary to remove pins between the worm body and the worm receptacle for the angular adjustment and, after the angular adjustment, to restore the connection between the worm body and the worm receptacle by new pre-drilling and pinning.

The invention has been described above using the example of a treatment machine 1 in the form of a labelling machine. It goes without saying that the invention can also be used on any treatment machine for bottles or similar containers, in which the bottles or containers are brought to a container feeding means at least consisting of an inlet worm and an attached inlet or transport star, individually and at intervals corresponding to a machine gauge. In particular, the invention can be used in filling machines, in machines for printing onto containers, in rinsers, inspection machines, etc.

LIST OF REFERENCE NUMBERS

1 treatment machine
2 container or bottle
3 external transporter
3.1 guide rails of the transporter 3
4 container feeding means
5 treatment position
6 rotor
7, 8 labelling unit
9 container outlet
10 external transporter
11 inlet worm
11.1, 11.2 worm end
12 inlet star
13 worm body
14 helix
15 worm receptacle
16 transfer position
17 container receptacle
18 guide curve
19 opening in worm body 13
19.1, 19.2 opening section
19.3 area
19.4 shoulder
20, 21 coupling element
20.1 external toothing
21.1 inner toothing
22 head piece
23 pins
24 split-pin
25 pressure spring
26 intermediate ring
27 bearing and/or drive element
28 clamping cone
29 clamping ring or cone ring
A transport direction of the transporter 3
B direction of rotation of the rotor 6
C transport direction of the transporter 10
D relative movement of the worm receptacle 15

The invention claimed is:

1. An apparatus for use in treatment machines for the treatment of containers, said apparatus comprising: at least one distributing or inlet worm provided on a transport path, a drive device for driving said inlet worm so as to rotate about a worm axis thereby forming a conveying path or helix for the containers on at least one worm body provided on a worm receptacle, at least one transport star assigned to the inlet worm, said transport star being driveable by a drive device so as to rotate about a transport star axis, for the synchronous and angularly accurate driving of the at least one inlet worm and of the at least one transport star, and in a drive train between the at least one worm body and the drive device, means for coupling and/or adjustment for enabling an angular adjustment of an angular position of the inlet worm and/or of the at least one worm body relative to an angular position of the at least one transport star and/or a position of the inlet worm and/or a position of the at least one worm body relative to the at least one transport star.

2. The apparatus of claim 1, wherein the means for coupling and/or adjustment is configured to break a connection between the drive device and the inlet worm and/or the at least one worm body for the angular adjustment, and to subsequently restore the connection between the drive device and the inlet worm and/or the at least one worm body following completion of the angular adjustment.

3. The apparatus of claim 2, wherein the means for coupling and/or adjustment means comprises one of a detachable clamp connection and a coupling unit in the drive train.

4. The apparatus of claim 3, wherein the means for coupling and/or adjustment comprises at least two separable coupling elements, at least one of said coupling elements having a multiplicity of catches and/or teeth, and wherein one coupling element comprises at least one mating catch co-operating with the catches and/or teeth.

5. The apparatus of claim 4, wherein each of the at least two separable coupling elements comprises teeth that engage each other when the worm body is driveably connected to the drive device.

6. The apparatus of claim 2, wherein the means for coupling and adjustment breaks and restores the driving connection between the inlet worm and/or the at least one worm body and the drive device by axial displacement of the at least one worm body relative to the worm receptacle.

7. The apparatus of claim 1, wherein the means for coupling and/or adjustment is pre-tensioned by spring means in a condition that interrupts a driving connection between the inlet worm and/or the at least one worm body and the drive device.

8. The apparatus of claim 1, wherein the means for coupling and/or adjustment is provided between the at least one worm body and the worm receptacle.

9. The apparatus of claim 1, wherein the means for coupling and/or adjustment comprise an adjusting device of the worm receptacle.

10. The apparatus of claim 1, wherein the means for coupling and/or adjustment means comprise a gear in the drive train, the gear enabling adjustment of the angle of rotation.

11. The apparatus of claim 1, wherein the worm receptacle comprises a shaft or rod, and wherein the at least one worm body surrounds at least part of the worm receptacle.

12. An apparatus comprising a rotating rotor having several treatment positions provided thereon, the apparatus further comprising at least one container feeding means for separating the containers fed therein, and for passing on each container to a treatment position, the container feeding means including the limitations of claim 1.

13. The apparatus of claim 12, further comprising a machine selected from the group consisting of: a labelling machine, a machine for printing on the container, a filling machine, a rinser or an inspection machine, wherein said container feeding means cooperates with said selected machine.

14. The apparatus of claim 1, wherein the transport star comprises container receptacles distributed around the transport star axis at equal angular intervals corresponding to a machine gauge.

15. The apparatus of claim 4, wherein the mating catch comprises at least one tooth.

16. The apparatus of claim 5, wherein the teeth comprise a circular array of teeth concentrically surrounding an axis of the inlet worm.

17. The apparatus of claim 10, wherein the gear comprises a differential gear.

* * * * *